US008630462B2

(12) United States Patent
Darnell et al.

(10) Patent No.: US 8,630,462 B2
(45) Date of Patent: Jan. 14, 2014

(54) METHODS AND APPARATUS FOR IMPROVED MOTION CAPTURE

(75) Inventors: Nicholas Casey Darnell, Huntersville, NC (US); Jia-Chi Wu, Raleigh, NC (US)

(73) Assignee: Activate Systems, Inc., Atlanta, GA (US)

( * ) Notice: Subject to any disclaimer, the term of this patent is extended or adjusted under 35 U.S.C. 154(b) by 154 days.

(21) Appl. No.: 13/222,718

(22) Filed: Aug. 31, 2011

(65) Prior Publication Data
US 2012/0051596 A1    Mar. 1, 2012

Related U.S. Application Data

(60) Provisional application No. 61/378,454, filed on Aug. 31, 2010, provisional application No. 61/416,136, filed on Nov. 22, 2010, provisional application No. 61/417,649, filed on Nov. 29, 2010.

(51) Int. Cl.
*G06K 9/00*      (2006.01)

(52) U.S. Cl.
USPC .......................................... 382/107; 382/103

(58) Field of Classification Search
None
See application file for complete search history.

(56) References Cited

U.S. PATENT DOCUMENTS

| | | | |
|---|---|---|---|
| 6,596,967 | B2 | 7/2003 | Miesak |
| 2007/0098218 | A1* | 5/2007 | Zhang et al. ................ 382/103 |
| 2008/0002857 | A1 | 1/2008 | Tsunashima |
| 2008/0100825 | A1* | 5/2008 | Zalewski ...................... 356/29 |
| 2009/0228841 | A1 | 9/2009 | Hildreth |
| 2010/0002909 | A1 | 1/2010 | Lefevre et al. |
| 2010/0306710 | A1* | 12/2010 | Poot .............................. 715/856 |

OTHER PUBLICATIONS

Jason Repko, "Head Typing As a Literacy Learning Tool", 2005, Research at UNC.*
Vladimir I. Pavlovic; Rajeev Sharma; and Thomas S. Huang, "Visual Interpretation of Hand Gestures for Human-Computer Interaction: A Review", Jul. 1997, IEEE Transactions on Pattern Analysis and Machine Intelligence, vol. 19, No. 7.*
International Search Report and Written Opinion for PCT International Application No. PCT/US2011/049961, mailed Dec. 22, 2011.

\* cited by examiner

*Primary Examiner* — Bhavesh Mehta
*Assistant Examiner* — Siamak Harandi
(74) *Attorney, Agent, or Firm* — Arnold & Porter LLP

(57) ABSTRACT

An apparatus includes an acquisition module, an area definition module, a comparison module and a rendering module. The acquisition module is configured to receive a first position datum and a second position datum associated with a position of an object at a first time and a second time, respectively. The area definition module is configured to set an area surrounding a first object position associated with a focal point of the first position datum as a dead-zone. The comparison module is configured to determine whether a focal point of the second position datum is within that area. If yes, the rendering module is configured to maintain a position on a display of a graphic. Otherwise, the area definition module is configured to set an area surrounding a second object position associated with the first object position and the focal point of the second position datum as the dead-zone.

20 Claims, 7 Drawing Sheets

METHODS AND APPARATUS FOR IMPROVED MOTION CAPTURE

CROSS-REFERENCE TO RELATED APPLICATIONS

This application claims priority to and the benefit of U.S. Provisional Patent Application No. 61/378,454, filed Aug. 31, 2010, and entitled "System And Methods For Motion Capture," U.S. Provisional Patent Application No. 61/416,136, filed Nov. 22, 2010, and entitled "Stabilization Of Noisy Motion Capture Objects At Rest," and U.S. Provisional Patent Application No. 61/417,649, filed Nov. 29, 2010, and entitled "Grasping As A Proxy For Selection/Deselection In A Hand-Tracking-Based User Interface," each of which is incorporated herein by reference in its entirety.

BACKGROUND

Some embodiments described herein relate generally to motion capture systems, and, in particular, to methods and apparatus for improved motion capture and user interface technologies.

A motion capture system typically can record the motion of an individual in the real world and use the gathered information to simulate that individual actor's motion in a virtual environment (or "virtual world"). Some known motion capture systems employ body markers physically coupled to an actor's clothing or body to enable continuous tracking of the actor's position and movements. The use of such body markers, however, is impractical or inconvenient in some instances. Some other known motion capture systems use a video camera and computer processing to map real-world actor movement onto a virtual character rendered within a virtual environment. Such a process, however, often includes significant amounts of noise data, which results in "jitter" (small, random vibrations of the virtual character about the true actor) and/or other effects that tend to negatively affect the user experience.

Some known motion capture systems can also use the gathered information recorded from the motion of an individual in the real world to determine an intended user command, such as a user-interface (UI) command. Such a motion capture system typically maps a predefined set of user movements, actions and/or gestures to a set of UI commands. However, the analog nature of user movements can be perceived as a fairly counterintuitive mapping to a binary UI command (e.g., a selection or deselection command).

Accordingly, a need exists for markerless motion capture systems and methods capable of providing a more accurate, stabilized, reduced-jitter output, as well as a motion-capture-based gesture that more intuitively maps between specified user movements and binary UI commands.

SUMMARY

An apparatus includes an acquisition module, an area definition module, a comparison module and a rendering module. The acquisition module is configured to receive a first position datum and a second position datum associated with a position of an object at a first time and a second time, respectively. The area definition module is configured to set an area surrounding a first object position associated with a focal point of the first position datum as a dead-zone. The comparison module is configured to determine whether a focal point of the second position datum is within that area. If yes, the rendering module is configured to maintain a position on a display of a graphic. Otherwise, the area definition module is configured to set an area surrounding a second object position associated with the first object position and the focal point of the second position datum as the dead-zone.

DETAILED DESCRIPTION

Figure 1:
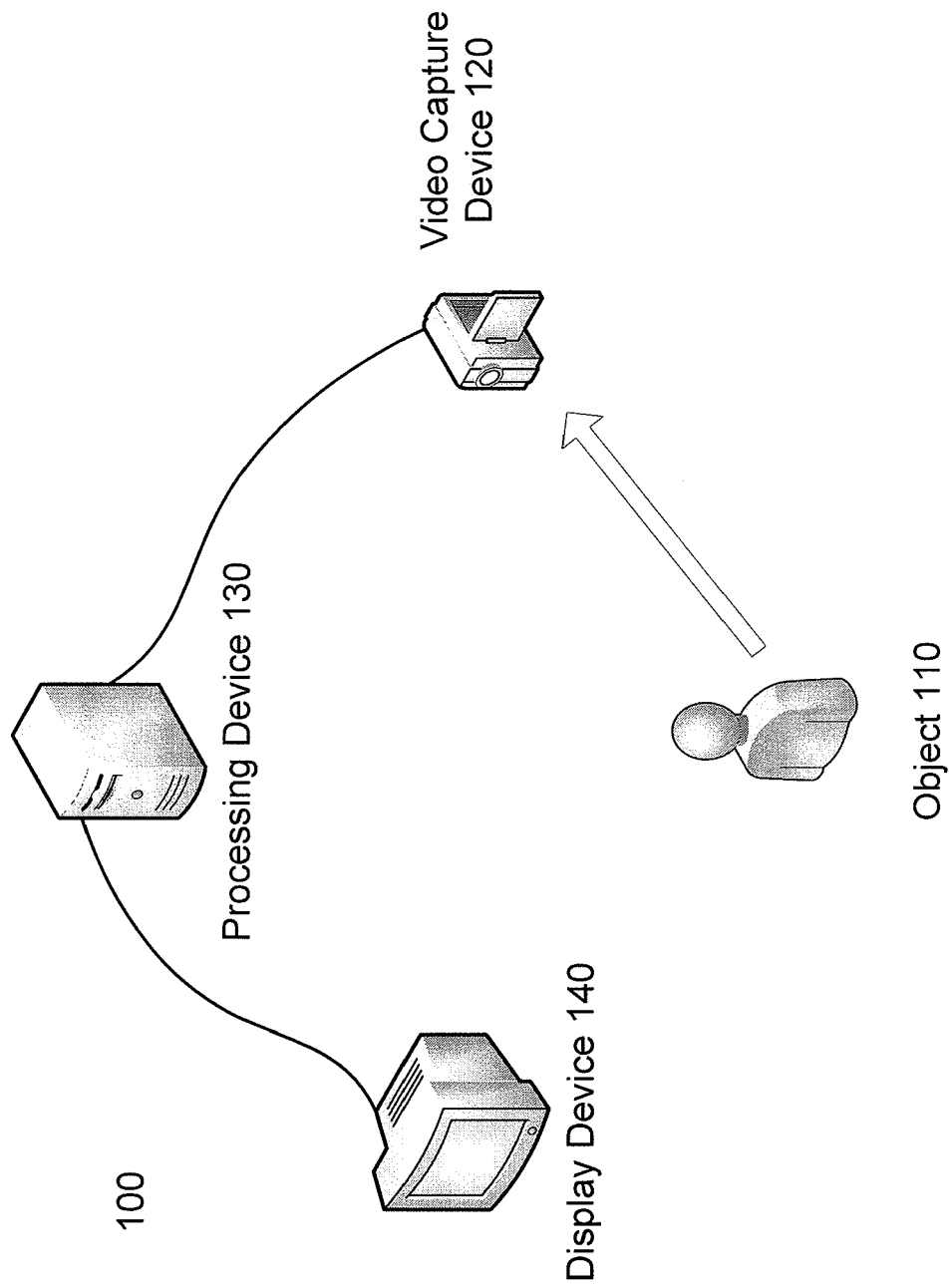
FIG. 1 is a schematic illustration of a motion capture system, according to an embodiment.

In some embodiments, an apparatus includes an acquisition module, an area definition module, a comparison module, and a rendering module. The acquisition module is configured to receive a first position datum associated with a position of an object at a first time, and receive a second position datum associated with a position of the object at a second time after the first time. The area definition module is configured to define a focal point of the first position datum, and then set an area surrounding a first object position associated with the focal point of the first position datum as a dead-zone at substantially the first time (e.g., within a time period after the first time). The comparison module is configured to determine whether a focal point of the second position datum is within the area surrounding the first object position substantially at the second time (e.g., within a time period after the second time). If the focal point of the second position datum is outside the area surrounding the first object position, the area definition module is configured to set an area surrounding a second object position as the dead-zone at substantially the second time, where the second object position is associated with the first object position and the focal point of the second position datum. Meanwhile, the rendering module is configured to modify a position on a display of a graphic. Otherwise, if the focal point of the second position datum is within the area surrounding the first object position, the area definition module is configured to maintain the area surrounding the first object position as the dead-zone at substantially the second time, and the rendering module is configured to maintain the position on the display of the graphic. In some embodiments, the graphic is a cursor or a representation of at least a portion of the object.

In some embodiments, the area surrounding the second object position has a size greater than a size of the area surrounding the first object position based on a characteristic (e.g., velocity, acceleration etc.) of movement of the object between the position of the object at the first time and the position of the object at the second time. In some other embodiments, the area surrounding the second object position has a size less than a size of the area surrounding the first object position based on a characteristic (e.g., velocity, acceleration, etc.) of movement of the object between the position of the object at the first time and the position of the object at the second time. In some embodiments, where the size is based on the velocity, the determination can be based on one or more of speed and/or direction.

In some embodiments, a non-transitory processor-readable medium stores code representing instructions to cause a processor to receive a first position datum associated with a position of an object at a first time, and code representing instructions to cause the processor to define a focal point of the first position datum and an area surrounding a first object position associated with the focal point of the first position datum. The code represents instructions to cause the processor to receive a second position datum associated with a position of the object at a second time. The position of the object at the second time is different than the position of the object at the first time. The code further represents instructions to cause the processor to maintain a position on a display of a graphic at the first object position in response to a focal point of the second position datum being within the area surrounding the first object position. In some embodiments, the graphic is a cursor or a representation of at least a portion of the object. In some embodiments, the object is at least one of a projectile, an instrument, a tool, an animal, a human or a human body part.

In some embodiments, the code represents instructions to cause the processor to receive a third position datum associated with a position of the object at a third time. In some embodiments, the code represents instructions to cause the processor to send, based on a focal point of the third position datum being outside the area surrounding the first object position, a signal to move the graphic from the first object position on the display to a second object position on the display. The first object position on the display is associated with the focal point of the first position datum, and the second object position on the display is associated with the first object position and the focal point of the third position datum.

In some embodiments, the code also represents instructions to cause the processor to define, based on the focal point of the third position datum being outside the area surrounding the first object position, an area surrounding the second object position. In some embodiments, the area surrounding the second object position has a size greater than a size of the area surrounding the first object position based on a velocity (i.e., speed and/or direction) of movement of the object between the position of the object at the first time and the position of the object at the third time. In some other embodiments, the area surrounding the second object position has a size less than the size of the area surrounding the first object position based on a velocity of movement of the object between the position of the object at the first time and the position of the object at the third time.

As used in this specification, the singular forms "a," "an" and "the" include plural referents unless the context clearly dictates otherwise. Thus, for example, the term "a module" is intended to mean a single module or a combination of modules.

FIG. 1 is a schematic illustration of a motion capture system 100, according to an embodiment. The motion capture system 100 can be used in, for example, a video game system, an object tracking system, a motion-capture-based user interface (UI) system, etc. As shown in FIG. 1, the motion capture system 100 can include a video capture device 120, a processing device 130, and a display device 140. The motion capture system 100 can interact with an object 110. The components of the motion capture system 100 can be physically connected to each other (e.g., the video capture device 120 and the processing device 130) and/or operatively coupled to each other (e.g., the video capture device 120 and the display device 140). Furthermore, some of the components of the motion capture system 100 can be connected using an electrical connection (as shown in FIG. 1), a fiber-optic connection, a wireless connection, or the like. In some embodiments, one or more components of the motion capture system 100 can be part of a common device.

The object 110 can be any object whose motion (e.g., movements, actions, change of positions) can be captured and converted into a virtual object rendered within a virtual environment. The object 110 can be, for example, a human being, a human body part, an animal, a robot, an instrument, a tool, a projectile, etc. In some embodiments, the motion of the object 110 can be an active motion, such as a user grasping his/her hand, a running dog, etc. In other embodiments, the motion of the object 110 can be a passive motion, such as a bouncing ball, a flying kite, etc.

In some embodiments, the object 110 can be both a user or operator of the motion capture system 100 and an object captured by the motion capture system 100. For example, the object 110 can be a user of a video game system who controls an on-screen virtual character (or "avatar") based on his/her own real-world body position and movement. In such embodiments, although not shown in FIG. 1, the display device 140 can face the object 110 to provide visual feedback to the object 110. In some other embodiments, the object 110 can be an object whose motion is monitored by a user or operator of the motion capture system 100 that is different than the object 110. For example, the object 110 can be a baby whose actions are constantly monitored by its parents. In such embodiments, as shown in FIG. 1, the display device 140 does not necessarily face the object 110.

The video capture device 120 can be any device that can be used to detect and/or record the motion (e.g., position, movement) of the object 110, and transfer the recorded information to the processing device 130. The motion of the object 110 can be captured in two- and/or three-dimensional space. The video capture device 120 can be, for example, a video camera, a video camcorder, a webcam, a cellular phone with video-capture functionality, etc. In some embodiments, the video capture device 120 can be a single-depth camera. In some other embodiments, the video capture device 120 can be other type of camera.

The processing device 130 can be any device with computer processing capabilities to map a real-world object's motion onto a virtual object and/or character rendered within a virtual environment. In some embodiments, the processing device 130 can employ a combination of hardware and/or software modules (stored and executing in hardware) that can convert captured video data describing an object's real-world positions and movements into positions and movements that fit within predetermined constraints of the virtual world in which a virtual object (e.g., an avatar, a cursor in a two-dimensional user interface, a three-dimensional virtual object in a virtual world, etc.) can be rendered. The processing device 130 can be, for example, a laptop, a desktop, a server, a PDA, etc. Details of the processing device 130 are further described with respect to FIGS. 2-3.

The display device 140 can be any device that can be used to display a virtual object, for example, an avatar of a real-world object (e.g., the object 110) within the virtual world. The display device can be, for example, a monitor, a television screen, a projector, or other type of display device.

In some embodiments, the motion capture system 100 can be configured to record the motion of the object 110 in the real world and use the gathered information to simulate the motion of the object 110 in a virtual environment display via the display device 140. Specifically, the video capture device 120 can be configured to record and produce video data associated capturing the motion of the object 110. The video capture device 120 can be configured to transmit the captured video data to the processing device 130. In response to receiving the captured video data describing the object 110's real-world position and movements within, for example, the three-dimensional space, the processing device 130 can be configured to convert the captured video data into positions and movements that fit within predetermined constraints of the virtual world in which a virtual object is rendered. These virtual positions and movements can then be applied to the virtual object, and subsequently rendered and output to the display device 140 to depict the movement of the virtual object within the virtual world. This process thus can provide nearly instantaneous feedback to, for example, a video game user/actor, of the effect of his or her real-world movements on those of the avatar within the virtual environment, thereby enabling the user to adjust his or her own real-world position to "control" the avatar within the virtual environment.

With such capabilities, the motion capture system 100 can be used for a variety of purposes associated with motion capture. For example, commercial entities can use a motion capture system similar to the motion capture system 100 to first record and then virtually reproduce the movements of a well-known individual, such as an athlete, in a computer or video game. The generated virtual representation of real-world movements is thus familiar to the video game's target market and can accordingly improve a user's perception of game authenticity.

In some other embodiments, the motion capture system 100 can function as a motion-capture-based UI system. Specifically, the motion capture system 100 can be configured to record the position and/or movement of an individual (i.e., the object 110) in the real world and use the gathered information to determine an intended user command, such as a user-interface command. The determined command can then be executed by the motion capture system 110, or another system (not shown in FIG. 1) operatively coupled the motion capture system 110, consistent with the user's intention. Similarly stated, the video capture device 120 (e.g., a single-depth camera) can be used to detect actor position and/or movement in two- and/or three-dimensional space. The video capture device 120 can be operatively and/or physically coupled to a hardware-based module and/or software-based module (embodied in hardware) configured to detect user movement and accordingly execute one or more user-interface commands. This technique can be used for a variety of purposes, many of which involve user hand-based control of a computer-generated UI. For example, software and/or hardware companies can design a menuing and/or other system as a user interface to a software application, such as a video game, an entertainment application, etc. In some embodiments, the hardware-based and/or software-based module can be referred to as a UI-command module, as further described with respect to FIG. 3.

In such UIs, the real-world user can perform one or more body movements, actions and/or gestures intended to trigger one or more rotations, movements and/or selections of one or more objects and/or other elements within the UI. For example, a user can control a cursor using such a UI. Using a predetermined mapping between a predefined set of user movements and a set of UI commands, the system can thus perform a particular UI command in response to captured, real-world user motion. The one or more UI commands can include, for example, rotation, movement, or manipulation of one or more on-screen objects, selection of one or more menu items, etc. In some instances, this interaction affords a user the sensation of organic, direct control over the UI, allowing for a more intuitive and pleasant user experience.

When the motion capture system 100 functions as a motion-capture-based UI system, the video capture device 120 can be used to capture the x-, y- and/or z-coordinate positions of various points along a user's body. By comparing these positions over discrete time intervals, the motion capture system 100 can detect motion of one or more parts of the user's body. As discussed above, based on this detected motion and one or more predefined UI gestures, the motion capture system 100 can determine a user's intended movement and/or selection of an on-screen (i.e., via the display device 140) UI element or object. More specifically, the motion capture system 100 can include gestures of a user associated with and/or mapped to either an analog or a binary user input. As an example of a mapping to an analog input, motion of an identified body part on the x and y axes can be mapped to horizontal and vertical translation of an on-screen pointer or icon. Although in traditional "WIMP" (Windows, Icons, Menu, Pointer) interfaces binary input is typically received via a mouse click and/or unclick, in the motion capture system 100 that functions as a motion-capture-based UI system, the binary input can be associated with, for example, a certain distance of the video capture device 120 from a user's hand, a user hand position or movement in a particular direction, and/or the like. Details of the motion capture system 100 functioning as a motion-capture-based UI system are further described with respect to FIGS. 3-7.

Figure 2:
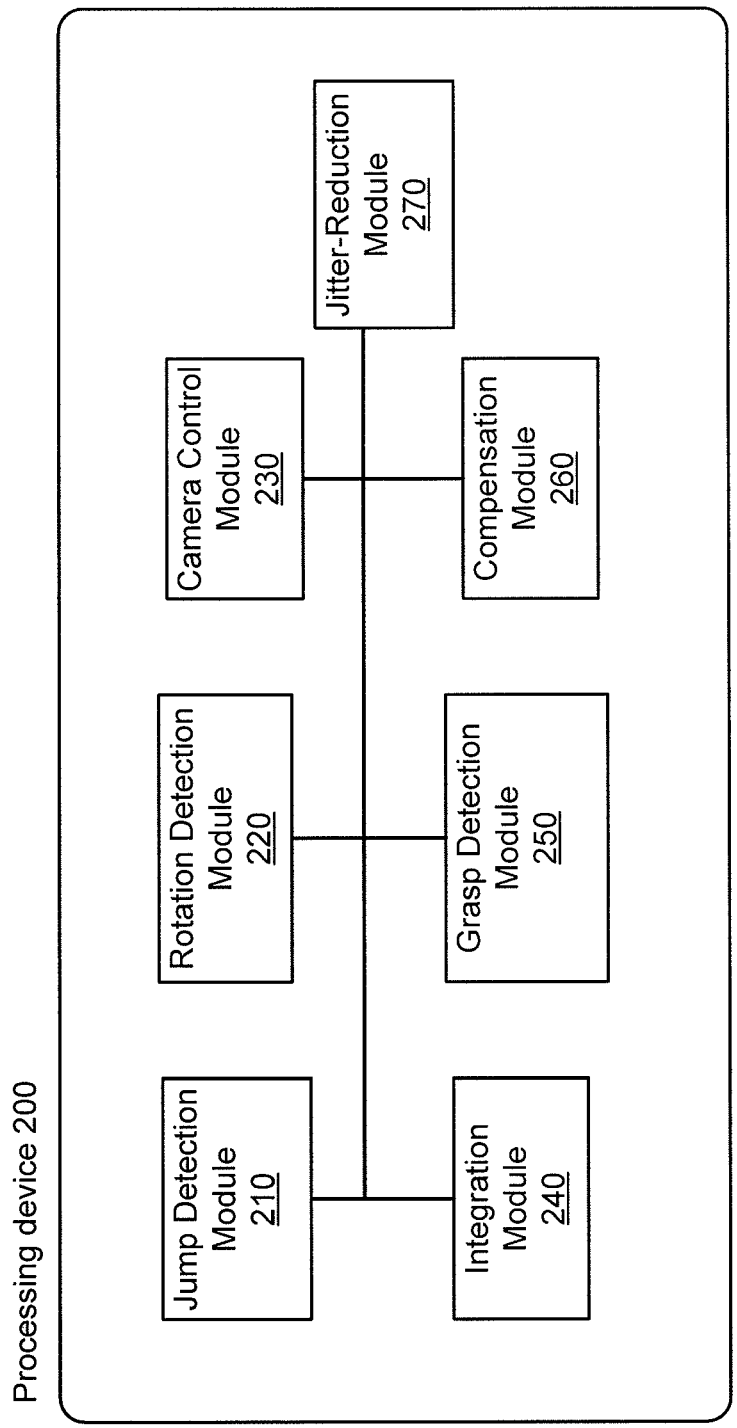
FIGS. 2 and 3 are schematic illustrations of processing devices used in motion capture systems, according to embodiments.

FIG. 2 is a schematic illustration of a processing device 200 used in a motion capture system, according to an embodiment. The processing device 200 can be structurally and functionally similar to the processing device 130 shown and described with respect to FIG. 1, and the motion capture system that employs the processing device 200 can be structurally and functionally similar to the motion capture system 100 shown and described with respect to FIG. 1. Specifically, the processing device 200 can be configured to convert captured video data describing an object's real-world positions and movements into positions and movements that fit within predetermined constraints of the virtual world in which a virtual object (e.g., avatar, cursor, representation of an object) can be rendered. Particularly, the processing device 200 can employ a set of hardware/software modules to accurately map real-world actor positions and movements to the virtual object rendered within a virtual environment, as described in detail below.

As shown in FIG. 2, the processing device 200 can include a jump detection module 210, a rotation detection module 220, a camera control module 230, an integration module 240, a grasp detection module 250, a compensation module 260, and a jitter-reduction module 270. Each of those modules can include one or more software (stored and executing in hardware) and/or hardware-based modules or components. In some embodiments, the processing device 200 can include a processor, a CPU, or the like, which is configured to execute the modules 210-270. In some embodiments, each of the modules 210-270 in the processing device 200 can include a field-programmable gate array (FPGA), an application specific integrated circuit (ASIC), a digital signal processor (DSP) and/or the like.

The jump detection module 210 can be configured to determine when one or more object movements (e.g., movements of a human actor, an animal actor, a robot actor, etc.) detected by a video capture device (e.g., the video capture device 120 in FIG. 1; not shown in FIG. 2) are part of and/or constitute a jump motion of the actor. In some embodiments, the jump detection module 210 can optionally be operatively and/or physically coupled to the video capture device, and receive captured data associated with actor movements from the video capture device.

In some embodiments, the jump detection module 210 can employ one or more computer vision algorithms (e.g., algorithms used to extract information such as position data from an image captured by a video capture device) associated with the video capture device to determine the actor's real-world center-of-mass ("COM"). Having determined the actor's COM, the jump detection module 210 can detect movement of the real-world actor in the same direction as gravity (i.e., in a downward direction toward the floor along the y-axis). This detection can, for example, determine when the actor has lowered his or her COM by bending his or her knees in preparation for performing a jump. In some embodiments, the jump detection module 210 can project the actor's downward movement onto a vector, and determine the magnitude of the vector to appropriately measure and/or approximate the actor's velocity in the direction of gravity. If at any point during this detected downward movement the jump detection module 210 determines that the velocity of the actor's movement in the direction of gravity meets or exceeds a predetermined and/or configurable threshold value, the jump detection module 210 can define a sliding time window of a predetermined and/or configurable duration. This sliding time window can, for example, be a window of time during which the jump detection module 210 is configured to detect any movement of the actor's COM in a direction opposite gravitational force (i.e., in an upward direction along the y-axis). For example, in some embodiments, the jump detection module 210 can be configured to, at this point, define a sliding window of duration of 100 milliseconds.

During the sliding time window, the jump detection module 210 can determine, at each captured frame, an instantaneous velocity of the actor's COM in the direction opposite gravity. The jump detection module 210 can determine that the actor has jumped if in a video frame captured during the sliding time window the instantaneous velocity of the actor's COM against gravity (i.e., upward velocity) meets or exceeds a predetermined or configurable threshold value. Having made this determination, the jump detection module 210 can output an indicator of the detected jump and/or other associated values or indicators (such as the actor's upward velocity) to one or more other hardware- and/or software-based modules associated with the motion capture system that employs the jump detection module 210.

If, however, the jump detection module 210 determines that the actor's upward velocity does not meet or exceed the threshold, it can be configured to take no action, thereby allowing time to continue passing (i.e., accumulating) within the sliding time window. Alternatively, if the jump detection module 210 determines that the sliding time window has expired (i.e., the predetermined duration has passed without a detected upward velocity greater than the threshold), the jump detection module 210 can be configured to recommence the above-described check for a threshold level of downward velocity. Thus, using the downward velocity and the upward velocity, the jump detection module 210 can detect a jump of an object.

The rotation detection module 220 can be configured to detect when a real-world object (e.g., a human actor, an animal actor, a robot actor, etc.) is turning and/or rotating relative to a video capture device (e.g., the video capture device 120 in FIG. 1) and/or a display device (e.g., the display device 140 in FIG. 1) currently displaying the rendered virtual world and/or the virtual object.

As described above, some motion capture systems employ a display device facing an actor to provide visual feedback via an output display shown in the display device. Some such motion capture systems encounter difficulty when the actor desires to induce his or her associated avatar to turn around within the virtual world. More specifically, to induce an avatar to turn around in the virtual world, the actor would be forced to turn his or her back to the video capture device and display device, thereby losing the ability to see the output display (and also occluding one or more parts of the actor's body, such as a hand and/or arm). Thus, in some embodiments, the rotation detection module 220 can render avatar rotation of an amount or degree proportionally less than that of the real-world actor, thereby allowing the actor to induce rotation of the avatar while preserving his or her view of the output display. To do so, the rotation detection module 220 can calculate or determine a relative angle of the actor's shoulders and/or hips to the video capture device. The rotation detection module 220 can then optionally determine and render rotation of the avatar based on a scalar value of a predefined maximum rotation rate.

In some embodiments, for example, the rotation detection module 220 can, based on received captured video data and/or frames, determine whether the actor's amount or degree of rotation relative to the video capture device meets or exceeds a lower threshold value. The lower threshold value can optionally be predetermined and/or configurable by a user of the motion capture system, such as an actor or other individual. The lower threshold value can be, for example, thirty degrees. If the rotation detection module 220 determines that the actor's rotation is less than the lower threshold value, the rotation detection module 220 can conclude that the actor is not currently intending to rotate the avatar, and thus maintain a position of the avatar. However, if the rotation detection module 220 determines that the actor's rotation meets or exceeds the lower threshold value, the rotation detection module 220 can next determine whether the actor's amount or degree of rotation meets or exceeds an upper threshold value. The upper threshold can be, for example, sixty degrees. If the rotation detection module 220 determines that the actor's amount of rotation meets or exceeds the upper threshold value, the rotation detection module 220 can next assign a predefined and/or preconfigured maximum rotation rate value to be the avatar's current rotation rate. The avatar can then be shown to rotate at the max rotation rate on display. In some embodiments, the avatar's current rotation rate can be expressed in terms of degrees per second or degrees per frame.

In some embodiments, if the rotation detection module 220 determines that the actor's amount of rotation does not meet or exceed the upper threshold value, the rotation detection module 220 can calculate the avatar's current rotation rate based on a scalar multiple of the predefined maximum rotation rate. In some embodiments, the rotation detection module 220 can first calculate a normalized input angle, optionally denoted by n. In some embodiments, the normalized input value can be the lesser of 1 or the value calculated by the formula n=(relativeAngle−lowThreshold)/(highThreshold−lowThreshold), where relativeAngle is the amount in degrees of the actor's rotation relative to the video capture device, lowThreshold is the lower threshold value as described above, and highThreshold is the upper threshold value as described above. Thus, as described in the above formula, the normalized input value n can be the amount of rotation of the real-world actor relative to a total possible amount of actor rotation as defined by the upper and lower threshold rotation values.

Having calculated the normalized input value, the rotation detection module 220 can calculate the above-described scalar multiple. To do so, the rotation detection module 220 can use one or more control curve functions calculated based at least in part on the normalized input value, n. For example, in some embodiments, the scalar multiple can be calculated based at least in part on the control curve formula: scalar multiple=$(n^2+0.5n)/1.5$, where n is the normalized input value described above. In some embodiments, the scalar multiple can be calculated based at least in part on one or more control curve formulas, such as the control curve formula described above and/or one or more other control curve formulas.

Having calculated the scalar multiple value, the rotation detection module 220 can next calculate the avatar's current rotation rate. In some embodiments, the rotation detection module 220 can, for example, use the following formula: Avatar rotation rate=maximumTurnRate*scalar multiple, where maximumTurnRate is a predefined and/or configurable maximum rotation rate for the avatar. In some embodiments, maximumTurnRate can be defined and/or expressed in terms of degrees per second and/or frame. Having determined the avatar's current rotation rate, the rotation detection module 220 can send one or more signals configured to cause the avatar to rotate at that rotation rate, in the same direction as the real-world user's actual body rotation. In some embodiments, when the real-world actor reorients his or her body to the video capture device (based on, for example, the angle of the actor's hips and/or shoulders), the rotation detection module 220 can send a signal indicating that avatar rotation should cease.

The camera control module 230 can be configured to detect when a real-world actor intends to control a virtual camera within a virtual world (i.e., the angle, frame and/or level of zoom presented by the output display via the display device rendering that virtual world). Particularly, because some motion capture systems translate an actor's recorded positions over time into avatar movement within a virtual world, the actor can encounter difficulty when performing movements intended not to control the avatar's movement, but rather the frame of view of the virtual world presented by the system via the output display. In some embodiments, for example, the camera control module 230 can be configured to differentiate actor movement intended to control this frame of view into the virtual world (known as "symbolic input" of a "virtual camera") from actor movement meant to control and/or be rendered as movement of the avatar (known as "direct input" or "performance").

In some embodiments, to perform this differentiation and thus properly interpret and execute functionality based on actor movement, the camera control module 230 can define one or more "focus gestures" that, when performed by an actor and observed by the camera control module 230, indicate the actor's desire to control the virtual camera rather than the avatar. In some embodiments, the one or more focus gestures can be any gesture or movement sufficiently different from those associated with control of the avatar to be distinguished by the camera control module 230. For example, a focus gesture intended to switch the camera control module 230 into a camera control state within the context of an American football video game could include one or more rotations of the wrist with an open hand. For another example, a focus gesture intended to switch the camera control module 230 into a camera control state within the context of a simulated soccer match could include a grasping action of a hand, or a finger pointing to a certain direction (e.g., to the camera).

Having determined that the actor desires to provide symbolic input, the camera control module 230 can enter a camera control state, wherein any movements or gestures performed by the actor can be interpreted as controls of one or more elements or properties of the virtual camera. For example, upon entry of the camera control state, the camera control module 230 can interpret one or more movements of the actor to indicate a desire to cause the virtual camera to zoom in, zoom out, pan left, pan right, pan up, or pan down. For another example, the camera control module 230 can also interpret actor movement to indicate a desire to rotate the virtual camera, adjust the viewing angle or perspective, adjust the focus of the virtual camera, etc.

In some embodiments, the camera control module 230 can define one or more actor gestures or movements designed to indicate the termination of camera control by the actor. When one or more such movements is detected by the camera control module 230, the camera control module 230 can exit the camera control state and return to an avatar control state, i.e., to interpret actor movement as intended control of the avatar within the virtual world.

The integration module 240 can be configured to integrate performance-based movement of an actor to a physically simulated virtual world. Particularly, because an actor performing movements within the real world is not subject to the same constraints as his or her associated avatar within a virtual world, in some instances a direct translation of the actor's movement to the virtual world can result in unintended movements and/or consequences for the avatar within that virtual world. For example, in one scenario an actor can perform real-world movements that direct his avatar to grasp a horizontal bar that is of length 18 inches within a virtual world. In this example, if the actor holds his hands more than 18 inches apart, a motion capture system that directly translates the actor's movements will place one hand off the bar, resulting in the rendered avatar hanging by a single bar and/or falling from the bar.

Thus, in some embodiments, the motion capture system can include the integration module 240 configured to intercept and/or receive captured actor position and movement data before it is processed by another module of the motion capture system. Such an integration module 240 can, for example, analyze the captured data to determine whether one or more actor body and/or body part positions fall outside predefined constraints of the virtual world (such as the length of the horizontal bar described above). In such scenarios, the integration module 240 can, according to one or more predefined rules or directives, adjust or edit the captured data such that the actor's position and/or movement does not violate the relevant constraint(s) of the virtual world. In some embodiments, the predefined rules or directives can be defined based on one or more scenarios in which an actor's positions are discerned to only accidentally violate one or more constraints of the virtual world (i.e., when the actor's positions appear to be inconsistent with the actor's intended position and/or movement). Thus, in the above example, the integration module 240 can adjust captured data associated with the position of the actor's hands in space such that the actor's hands are 18 or fewer inches apart, and positioned such that they grasp the horizontal bar.

The grasp detection module 250 can be configured to detect when a real-world actor intends to grasp or release an object within the virtual world. In some embodiments, the grasp detection module 250 can be configured to use multiple grasp classifiers to determine if an actor is attempting to direct his or her avatar to grasp or release a virtual object. For example, the grasp detection module 250 can first use one or more computer vision algorithms to determine the central location of an actor hand in three-dimensional real-world space. This determination can be based at least in part on actor position and/or movement data captured by a video capture device physically and/or operatively coupled to the grasp detection module 250.

In some embodiments, the grasp detection module 250 can recursively perform one or more steps and/or calculations to determine the spatial boundaries and/or dimensions of the detected hand. More specifically, the grasp detection module 250 can, starting at a single-point/central sample of the hand, consider each captured pixel adjacent to that point/sample. The grasp detection module 250 can next determine, for each such pixel, whether that pixel represents part of a real-world object located within a preconfigured spatial depth distance from the central hand point. For example, the grasp detection module 250 can determine whether a given pixel adjacent to the central hand point is a predetermined distance (e.g., five or more centimeters) closer to or further from the video capture device than the central hand point. In some embodiments, the grasp detection module 250 can make this determination based at least in part on depth information captured and/or calculated by the video capture device and/or one or more other hardware- and/or software-based modules of the motion capture system.

In some embodiments, if, for a given pixel, the grasp detection module 250 determines that the considered pixel is more than the preconfigured spatial depth distance from the central hand point, the grasp detection module 250 can determine that the considered pixel is not part of the detected hand. If the grasp detection module 250 determines that the considered pixel is less than or equal to the preconfigured depth distance from the central hand point, the grasp detection module 250 can conclude that the considered pixel is part of the detected hand, and can include the pixel in a set of "hand pixels". In some embodiments, the grasp detection module 250 can perform this calculation and make this determination for each pixel adjacent to the central point, and then recursively perform the same calculation for each pixel adjacent to each of those points, recursing until no pixels within the preconfigured distance from the detected "hand pixels" is found. Thus, by performing this series of steps, the grasp detection module 250 can determine which pixels within a captured frame belong to the actor's hand, and thereby define a complete set of hand pixels.

Having made this determination and thereby defined a set of pixels that define an actor's hand, the grasp detection module 250 can next send the set of hand pixels to two or more classifier modules (not shown in FIG. 2). In some embodiments, each such classifier module can perform one or more operations, steps and/or calculations to determine whether the actor hand is currently open or closed. Because classifier modules can at times vary in accuracy, the grasp detection module 250 can employ two or more classifier modules, and be configured to change the current hand state (i.e., open or closed) if the two or more classifier modules generate the same open/closed determination, and when that determination is the opposite of the current hand state. In some embodiments, one of the two or more classifier modules can employ, for example, a supervised learning algorithm in the form of a support vector machine. In some embodiments, another of the two or more classifier modules can define a plane, the plane being based on a vector drawn from the actor's elbow to the actor's hand. The classifier module can, for example, project the set of hand pixels onto that plane and determine that the hand is open if the spatial distribution of the hand pixels on that plane exceeds a predetermined threshold value. In some embodiments, the grasp detection module 250 can be configured to only change the current hand state when the multiple classifier modules each generate the same output for two, three, or another specified number of consecutive frames.

Having determined the open or closed state of an actor's hand, the grasp detection module 250 can then send one or more signals to one or more other modules of the motion capture system for proper rendering of the avatar within a virtual world.

The compensation module 260 can be configured to adjust a gesture recognition process to compensate for properties of a lossy performance input system (e.g., video capture device 120 in FIG. 1) of the motion capture system. In such a system, one or more parts of an actor's body can be occluded from the video capture device's view for one or more frames, resulting in an absence of data for that particular body part for those frames. Thus, the compensation module 260 can be configured to supply pre-calculated data for the one or more occluded body parts so as to approximate as close as possible their position and movement within a virtual environment.

For example, in some scenarios an actor can perform a walking motion or movement that is captured by a video capture device physically and/or operatively coupled to the compensation module 260 and one or more other modules (e.g., the jump detection module 210, the grasp detection module 250) of the motion capture system. In such a scenario, for example, as an actor swings her arms while performing a walking motion, an actor's hand can be occluded from view of the video capture device as the hand passes behind the actor's hip. This occlusion can result in the video capture device failing to capture and/or record position and/or movement data for the hand during the period of time in which the hand is occluded. Thus, when attempting to map the actor's walking movements to one or more predefined example walking gestures or movements, this missing data complicates the mapping process, causing inappropriate mismatches for the occluded hand and/or other body parts.

In some embodiments, to overcome this issue, the compensation module 260 can be configured to reference both lossless (i.e., where the hand is not occluded), original versions of a predefined example motion and one or more lossy versions (i.e., where the hand is occluded) of the same predefined example motion that have been preemptively altered to account for the lost data. More specifically, when mapping actor movement in the above scenario, the compensation module 260 can reference an altered version of the predefined example motion in which actor hand data is missing or incomplete. By referencing this altered version of the predefined example motion, the compensation module 260 can avoid mismatches for the occluded hand or other body part, and thereby ensure that the mapping from the actor's actual positions and/or movement is accurate.

Having thus mapped from the actor's movement to the appropriate predefined example motion, the compensation module 260 can next reference the unaltered (i.e., lossless) version of that example motion so as to provide or "fill in" position information for the occluded body part or parts. In some embodiments, the compensation module 260 can reference a record and/or memory indicating at what point within the example motion the occlusion (and thus loss of data) occurs. Based on this reference point, the compensation module 260 can accordingly select the appropriate frame of the lossless version of the predefined example motion, ensuring that the correct motion information is returned for and "filled into" the lossy example motion for proper rendering of movement by the avatar. In some embodiments, this frame can be selected by an amount of time the actor has been in a specific zone, in which occlusion of the relevant body part is occurring. Having identified a proper and complete set of mapped avatar position and/or motion information, the compensation module 260 can send one or more signals configured to render the avatar positions and/or movements in the virtual world via an output display device.

The jitter-reduction module 270 can be configured to detect and reduce jitter in one or more objects and/or actors rendered in a virtual world. More specifically, the jitter-reduction module 270 can receive two- or three-dimensional position data associated with a recorded entity. The jitter-reduction module 270 can receive the position data from, for example, a video capture device currently capturing object position data and/or a software module, such as a software Application Programming Interface (API) module configured to return position data. In some embodiments, the received position data can be defined within a two- or three-dimensional spatial plane and can be organized in the form of (x, y) and/or (x, y, z) coordinates, respectively. The received position data can be associated with one or more specific objects, such as a projectile, instrument, tool, animal, human being, human body part, etc. In some embodiments, as discussed below, the received position data can be associated with a hand of a recorded individual. Although the below discussion relates to a recorded human hand, it should be understood that the discussed modules and/or steps can be performed for or with respect to any real-world object recorded and/or captured by any video capture device.

For example, the received position data can include multiple sets of x, y and z coordinate positions corresponding to various portions of or points on the recorded hand. In some embodiments, one or more of the x, y and z coordinates corresponding to a point on the recorded hand can optionally be an approximate coordinate position. Each approximate coordinate position can have a value that falls within a predefined error range. Similarly stated, each of the x, y and z coordinates corresponding to a point on or portion of the recorded hand can be inaccurate within a predefined threshold level. This inaccuracy amount can be referred to as "noise" in the captured position data.

The predefined error range can optionally be referred to as or represented by E. In some embodiments, each of the received x-, y- and z-coordinate position values can fall within a distinct predefined error range for the dimension to which that coordinate position pertains. Said differently, each of the received x-coordinate positions can be within a predefined error range value $E_x$; each of the received y-coordinate positions can be within a predefined error range value $E_y$; and each of the received z-coordinate positions can be within a predefined error range value $E_z$.

Having received the x-, y- and z-coordinate position data for the recorded object (e.g., the recorded human hand), the jitter-reduction module 270 can next calculate a set of three average (i.e., approximated "true") position values for the recorded object over a predetermined time period. In some embodiments, the set of three average position values can include an x-dimension average position value for the recorded object, a y-dimension average position value for the recorded object and/or a z-dimension average position value for the recorded object. In some embodiments, the jitter-reduction module 270 can optionally next combine the set of three average position values for the recorded object over the predetermined time period into a single average center-of-mass position value for the recorded object.

The jitter-reduction module 270 can determine whether the current position of any point on or portion of the recorded object is more than a threshold distance from the average position value for the recorded object. In some embodiments, the jitter-reduction module 270 can determine whether an x-dimension coordinate of the recorded object is more than an x-dimension threshold distance from the average x-dimension position value for the recorded object; whether a y-dimension coordinate of the recorded object is more than a y-dimension threshold distance from the average y-dimension position value for the recorded object; and/or whether a z-dimension coordinate of the recorded object is more than a z-dimension threshold distance from the average z-dimension position value for the recorded object. In some embodiments, the jitter-reduction module 270 can determine whether any position of a point on or portion of the recorded object is more than a three-dimensional threshold distance from the single average center-of-mass position value described above.

In some embodiments, if the jitter-reduction module 270 determines that no point on or portion of the recorded object has moved, in the specified time period, more than a threshold distance from the average position value for any of the three dimensions and/or from the single average center-of-mass position value, the jitter-reduction module 270 can temporarily cease to update the rendered representation of the recorded object. In this manner, the jitter-reduction module 270 can generate and/or define a stable rendering of the object—a rendering free from minor, instable variation (i.e., jitter). This temporary period of time can optionally be referred to as a "sleep period".

During the sleep period discussed above, the jitter-reduction module 270 can continue to receive x-, y- and/or z-coordinate position information from the video capture device and/or API. As this subsequent position information is received for the recorded object, the jitter-reduction module 270 can optionally send one or more signals indicating that the virtual position of the recorded "sleeping" object not be updated on a display device either in whole or in part. In other words, the jitter-reduction module 270 can optionally limit or cease rendering of motion along one or more of the x, y and z axes, while continuing to update the virtual position of the object along one or more other axes. For example, the jitter-reduction module 270 can cease to update the x-coordinate position of the object while in the "sleep" state (i.e., while detected x-dimension motion during the predetermined time period is less than $E_x$), but continue to update the y- and/or z-coordinate position of the object. In another example, the jitter-reduction module 270 can cease to update a virtual position of the object in all three (x, y and z) dimensions, thus rendering the object as completely motionless during the "sleep" period.

This subsequently-received position information can be compared to the average position value(s) previously calculated for the recorded object to determine whether any position coordinate in the subsequently-received position data is more than one or more of the threshold distances described above from the corresponding average position values also described above. If the jitter-reduction module 270 determines that no position coordinate in the subsequently-received position data exceeds the threshold distance corresponding to that position value, it can optionally continue to send one or more signals indicating that the virtual rendering of the recorded should not change (i.e., move). If, however, the jitter-reduction module 270 determines that one or more position coordinates in the subsequently-received position data is in fact more than one or more of the threshold distances away from the corresponding average position value, the jitter-reduction module 270 can determine that the recorded object is experiencing "true" (i.e., non-jitter-related) movement, and can send one or more signals indicating that the virtual representation of the object should reflect and/or be based at least in part on the most-recently-received position data for the object.

In some embodiments, the jitter-reduction module 270 can next apply one or more processes on the most-recently-received position data for the object. The one or more processes can include, for example, one or more smoothing filter operations configured to reduce any discontinuity between the average position for the recorded object (i.e., the "sleeping position") and the new, updated position for the recorded object (i.e., the "waking position").

Figure 3:
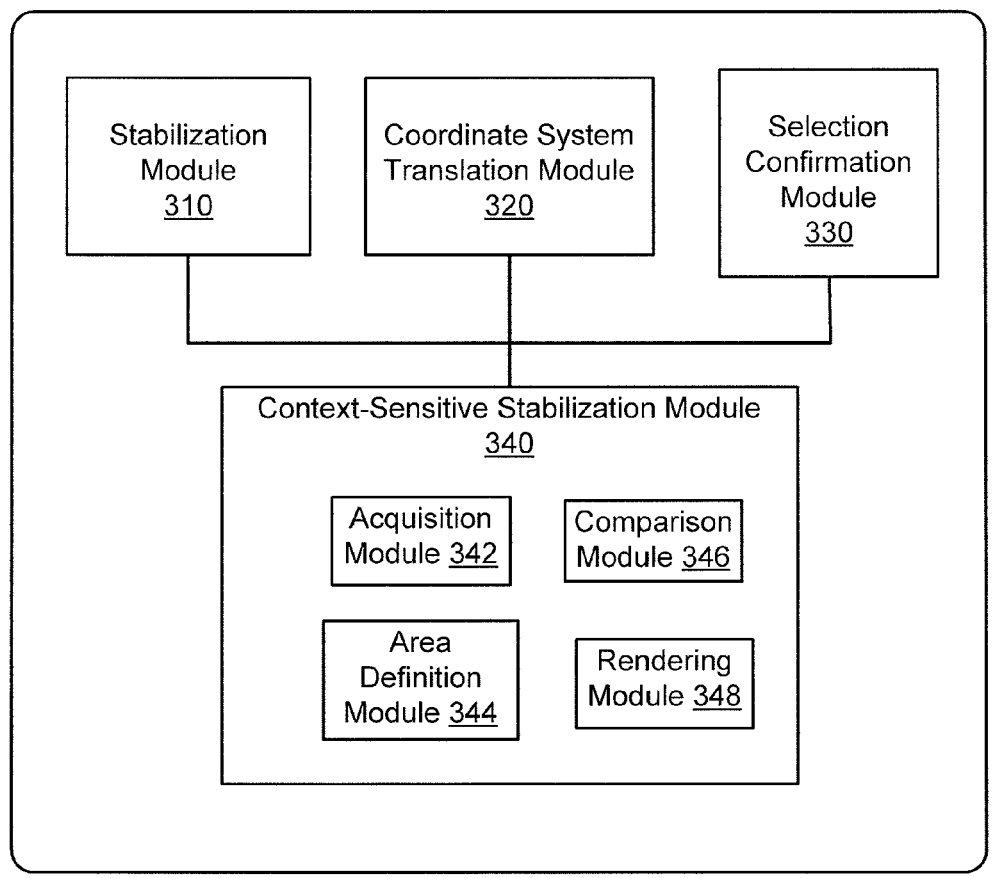

FIG. 3 is a schematic illustration of a processing device 300 used in a motion capture system, according to another embodiment. The processing device 300 can be structurally and functionally similar to the processing device 130 shown and described with respect to FIG. 1, as well as the processing device 200 shown and described with respect to FIG. 2. The motion capture system that employs the processing device 300 can function as a motion-capture-based UI system, which can be structurally and functionally similar to the motion capture system 100 shown and described with respect to FIG. 1. Specifically, the processing device 300 can be configured to use captured video data describing a user's movement to determine one or more intended user commands based the captured user movement, and accordingly execute one or more UI commands. In some embodiments, the processing device 300 can include a processor, a CPU, or the like.

As shown in FIG. 3, the processing device 300 can employ a set of hardware modules and/or software modules (executing in hardware), including a stabilization module 310, a coordinate system translation module 320, a selection confirmation module 330, and a context-sensitive stabilization module 340, which further includes an acquisition module 342, an area definition module 344, a comparison module 346 and a rendering module 348. Similar to the modules shown and described with respect to FIG. 2, each of the modules included in the processing device 300 can include one or more software (stored and executing in hardware) and/or hardware-based modules or components. In some embodiments, each of the modules in the processing device 300 can include a field-programmable gate array (FPGA), an application specific integrated circuit (ASIC), a digital signal processor (DSP) and/or the like. In some embodiments, those modules can be collectively referred to as a UI-command module.

More specifically, the stabilization module 310 can be configured to receive two- or three-dimensional position data associated with a recorded entity (e.g., the object 110 in FIG. 1). The stabilization module 310 can receive the position data from, for example, a video capture device (e.g., the video capture device 120 in FIG. 1) capturing object position data and/or a software module (not shown in FIG. 3), such as a software Application Programming Interface (API) module configured to return position data. In some embodiments, the received position data can be defined, by the coordinate system translation module 320, within a two- or three-dimensional space and be organized in the form of (x, y) and/or (x, y, z) coordinates. Furthermore, the received position data can be associated, by the selection confirmation module 330 and/or the context-sensitive stabilization module 340, with one or more specific objects, such as a human being or human body part (e.g., a human hand). In some embodiments, the object can be a human hand, the hand optionally covered in one or more materials, such as a glove or other article of clothing or material. Although the below discussion relates to a recorded human hand, it should be understood that the discussed modules and/or steps can be performed for or with respect to any real-world object capable of the motion described below and recorded and/or captured by a video capture device.

In use, the processing device 300 can be configured to receive captured video data from, for example, a video capture device (e.g., the video capture device 120 in FIG. 1; not shown in FIG. 3) that is operatively coupled to the processing device 300. The received data can be associated with, for example, positions and/or movements of a user's hand. Subsequently, the stabilization module 310 can be configured to convert the data to tracked joint positions of the human hand, and then stabilize the joint positions by a number of algorithms. In some embodiments, the stabilization module 310 can be configured to stabilize the data associated with the joint positions using one or more noise-reduction filters, such as for example, an average over a number of frames, a Kalman filter, a Double Exponential filter, etc. In some embodiments, the stabilization module 310 can be configured to stabilize the data associated with the joint positions using the jitter-reduction techniques described with respect to the jitter-reduction module 270 in FIG. 2.

In some embodiments, the coordinate system translation module 320 can use the stabilized data associated with the joint positions to convert positions in a real-world space into meaningful locations in a virtual-world space, such as a user interface. For example, a virtual rectangular prism can be centered about the user's shoulder and the hand position mapped into that prism can be used for input. For example, the coordinate system translation module 320 can be configured to convert the tracked joint positions to a normalized coordinate space (e.g., (−1,−1) represents the upper-left corner of a television screen while (1,1) represents the lower-right corner of the television screen). Furthermore, as a result of one or more locations in the user interface being determined based on the captured position(s) and/or movement(s) of the user's hand in the real world, one or more virtual items (e.g., a UI element, a UI object) located at those locations in the user interface can be selected.

In some embodiments, the coordinate translation conducted by the coordinate system translation module 320 can depend on the previously stabilized joint information provided by the stabilization module 310. Specifically, the coordinate system translation module 320 can use relationships between key body joints and construct the mapping. For example, the center of the coordinate space in the user interface can be based on a stabilized shoulder position of the user, and the extents (i.e., the outer boundaries) of the coordinate space can be a function of the user's arm length to enable the user to easily reach all areas of the user interface.

After virtual items in the user interface are selected, the selection confirmation module 330 can be configured to confirm that selection and/or perform subsequent operations on the selected items. In some embodiments, the selection confirmation module 330 can use approaches such as a grasping position detection (as described in detail below), a pushing gesture detection, or detection on other positions and/or gestures, to confirm a selection and/or perform a subsequent operation.

Figure 4B:
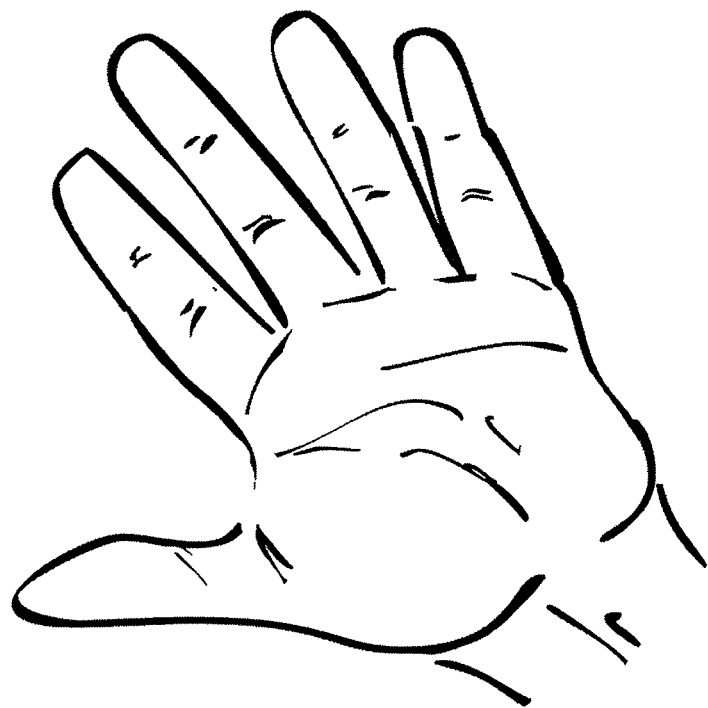
FIGS. 4A and 4B are illustrations of hand positions used in a motion capture system, according to an embodiment.
Figure 4A:

FIGS. 4A and 4B are illustrations of hand positions used in a motion capture system, according to an embodiment. Specifically, FIG. 4A illustrates a grasping position of a user's hand, and FIG. 4B illustrates an open-hand position of the user's hand. The hand positions illustrated in FIGS. 4A and 4B can be of a predefined motion of a user's hand that can be used in a grasping position detection, as described below.

In some embodiments, the position data received from the coordinate system translation module 320 can include multiple sets of x, y and/or z coordinate positions corresponding to various portions of or points on the recorded hand. In some embodiments, one or more of the x, y and/or z coordinates corresponding to a point on the recorded hand can optionally be an approximate coordinate position. In some embodiments, each approximate coordinate position can have a value that falls within a predefined error range. Said differently, each of the x, y and/or z coordinates corresponding to a point on or portion of the recorded hand can be inaccurate within a predefined threshold level.

Having received the x-, y- and/or z-coordinate position data for the recorded object (e.g., the recorded user's hand) from the coordinate system translation module 320, the selection confirmation module 330 can determine whether the object is performing a predefined grasping motion (to move, for example, to a grasping position as illustrated in FIG. 4A). Said differently, the selection confirmation module 330 can determine whether a hand is currently performing a gripping, grasping, closed fist, or similar movement and/or position. In some embodiments, the selection confirmation module 330 can make this determination based on one or more sets of x-, y- and/or z-coordinate position data for the hand. In some embodiments, each set of position data can be received at a distinct time from the coordinate system translation module 320.

In some embodiments, for example, if the selection confirmation module 330 determines that the object (e.g., the recorded hand) has moved from an open-hand position (e.g., the open-hand position illustrated in FIG. 4B) at a first time to a closed-hand/grasping position (e.g., the grasping position illustrated in FIG. 4A) at a second time, the selection confirmation module 330 can perform one or more actions. For example, the selection confirmation module 330 can confirm a selection of a UI component, execute the selection, and/or display the selection via on-screen feedback on a display device (e.g., the display device 140 in FIG. 1; not shown in FIG. 3). In some embodiments, the selection confirmation module 330 can await further position information associated with the hand before updating an on-screen display of the UI.

In some embodiments, for example, if, based on subsequently-received position data associated with the hand, the selection confirmation module 330 determines 1) that the hand is still in a grasping position/motion and 2) that the hand has moved in the x-, y- and/or z-directions, the selection confirmation module 330 can execute, for example, a drag of the selected UI element and/or object. In some embodiments, if, based on subsequently-received position data associated with the hand, the selection confirmation module 330 determines that the hand is no longer in a grasping position, the selection confirmation module 330 can execute one or more operations associated with a deselect command. For example, the selection confirmation module 330 can render a deselection of a selected UI element and/or object, thus freeing the user to move the hand (optionally functioning within the UI as a pointing device) to select one or more other elements for selection, manipulation, rotation, etc.

In some embodiments, the operations performed by the selection confirmation module 330 can cause the tracked position of the user's hand to drift in space. For example, with the grasping position detection, the actual tracked position of the user hand can shift as the hand changes shape. For another example, with the pushing gesture detection where the UI is two-dimensional (e.g., x- and y-directions), a push into the third dimension (e.g., z-direction) can cause a considerable shift in the x- and/or y-directions. In such embodiments, for example, the techniques described below with respect to the context-sensitive stabilization module 340 can be used to prevent false selection.

Because human motion is rarely completely isolated, selection of a virtual item and/or other operations on the virtual item may cause the position of the virtual item in the user interface to shift. In such scenarios, the context-sensitive stabilization module 340 can be used to limit the impact of such motion during confirmation while retaining responsiveness in other scenarios. Specifically, the context-sensitive stabilization module 340 can be configured to apply one or more stabilization technologies to improve the user interface based on current context and use. In some embodiments, the context-sensitive stabilization 340 (including the acquisition module 342, the area definition module 344, the comparison module 346, and the rendering module 348) can be configured to apply a cursor stabilization technology in a two-dimensional user interface, among other stabilization technologies. Although the below discussion relates to cursor stabilization, it should be understood that the discussed modules and/or steps can be performed for or with respect to any other potential stabilization technology on any other type of object in a similar way. For example, the cursor stabilization technology described herein can be applied to any other form of representation (e.g., a desktop icon, a shortcut of a UI element, an avatar, etc.) of, for example, any other type of recorded object (e.g., a human being, an instrument operated by a user, etc.), or at least a portion of a recorded object (e.g. a portion of a human body, a portion of a tool controlled by a user, etc.) in a two-dimensional user interface. For another example, the cursor stabilization technology described herein can also be applied to a three-dimensional virtual object displayed in a three-dimensional virtual world.

Given a cursor in a two-dimensional user interface, the movement of the cursor can be driven by natural user input (e.g., movements of an object, such as a user's hand or finger, a tool or instrument (e.g., a pointer, a mouse) controlled by a user, etc.). Initially, the acquisition module 342 can be configured to receive a first position datum associated with a position of the object at a first time. The first position datum can be in the form of coordinate position data associated with the recorded object at the first time that is provided from the previous processing modules (e.g., the stabilization module 310, the coordinate system translation module 320, the selection confirmation module 330). In the scenario of a two-dimensional user interface, the first position datum can be, for example, x- and y-coordinate position data associated with the position of the object at the first time.

After the first position datum is received at the acquisition module 342, the area definition module 344 can be configured to define a focal point of the first position datum. For example, if the first position datum is a pair of x- and y-coordinates of a specific position in the user interface that corresponds to the position of the object at the first time, the focal point of the first position datum can be defined as that specific position in the user interface. For another example, if the first position datum includes a set of x- and y-coordinates for multiple positions representing, for example, an area in the user interface associated with the position of the object at the first time, the focal point of the first position datum can be defined as a center-of-mass of that area (i.e., an x-coordinate that is an average of the set of x-coordinates included in the first position datum, and a y-coordinate that is an average of the set of y-coordinates included in the first position datum).

The area definition module 344 can be configured to define an object position and an associated dead-zone, based on the focal point of the first position datum, for the cursor in the two-dimensional user interface. The object position for the cursor represents the position of the cursor on the display of the user interface. Note that it is different from the position of the object, which is the position of the recorded object in the real world. In some embodiments, the object position of the cursor can be the focal point of the first position datum. In some other embodiments, the object position of the cursor can be, for example, determined based on the focal point of the first position datum and/or other parameters, such as a previous position of the cursor.

Figure 5:
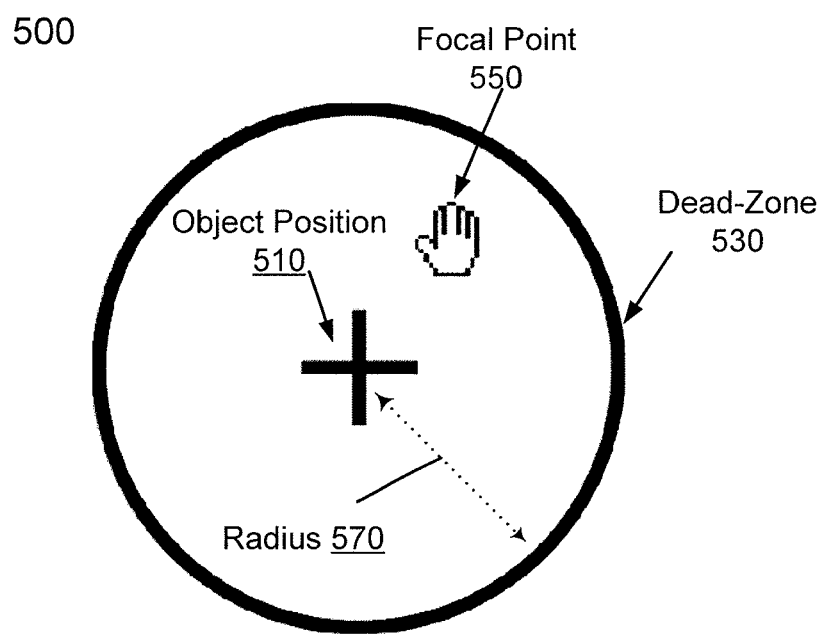
FIG. 5 is a schematic illustration of a cursor stabilization technology used in a motion capture system, according to an embodiment.

In some embodiments, the dead-zone for the object position of the cursor can be set by the area definition module 344 as, for example, an area surrounding that object position in the user interface. For example, the dead-zone for the object position can be set as a circle that is centered at the object position and has a predefined radius. Such a concept is illustrated in FIG. 5, where the crosshair indicates an object position 510 for the cursor in a display of the user interface 500, and an associated dead-zone 530 is the area within the circle that is centered at the object position 510 and has a radius 570. For example, the object position 510 can have a pair of x- and y-coordinates of (3, 2) (unit length) in the display of the user interface 500 that has a coverage of area from (−100, −100) to (100, 100), and the radius 570 can be 5 (unit length).

Although not shown and discussed herein, it should be understood that a dead-zone can be set in any other form and/or shape based on the corresponding object position and/or other parameters (e.g., a focal point, position datum). For example, a dead-zone can be set as a square, rectangle, oval and/or any other suitable shape around a corresponding object position. For another example, a dead-zone can be set in a shape based on a recorded object (e.g., the shape of a hand). In some embodiments, the cursor displayed in the user interface (e.g., at the object position associated with the focal point of the first position datum) is the only item that is actually drawn in the user interface presented to a user. Similarly stated, the associated dead-zone for the object position associated with the focal point of the first position datum is not shown to the user in the user interface. Additionally, in some embodiments, the focal point of the first position datum, the corresponding object position and dead-zone can be determined by the area definition module 344 at substantially the first time (e.g., within a small time period of the first time, such as, for example, 1 millisecond).

In some embodiments, the acquisition module 342 can be configured to receive a second position datum associated with a position of the object at a second time after the first time. Subsequently, similar to the first position datum, the area definition module 344 can be configured to define a focal point of the second position datum in the two-dimensional user interface. Furthermore, the comparison module 346 can be configured to compare the dead-zone for the object position of the cursor, which is associated with the focal point of the first position datum, and the focal point of the second position datum, and then determine whether the focal point of the second position datum is within the dead-zone for the object position of the cursor. Additionally, in some embodiments, the comparison can be performed by the comparison module 346 substantially at the second time. As shown in FIG. 5, for example, the hand icon shows a focal point 550 of the second position datum. In this example, the focal point 500 of the second position datum is inside the dead-zone 530 for the object position 510.

In some embodiments, for example, if the focal point of the second position datum is within the dead-zone for the object position of the cursor, the rendering module 348 can be configured to maintain the object position for the cursor on the display of the graphic (e.g., the virtual object) for the cursor in the user interface. Furthermore, the area definition module 344 can be configured to maintain the dead-zone for the object position of the cursor at substantially the second time. Said in another way, the position of the cursor is not moved from the current object position of the cursor to the focal point of the second position datum, or any other position on the display of the user interface. In such scenarios, the second position datum can be ignored or stored for any potential further processing. As shown in FIG. 5, because the focal point 550 of the second position datum is inside the dead-zone 530 (e.g., the focal point 550 can have a pair of x- and y-coordinates of (5, 5) (unit length)) for the object position 510 of the cursor, the object position 510 of the cursor does not move in the user interface.

Otherwise, if, for example, the focal point of the second position datum is outside the dead-zone for the object position of the cursor, the rendering module 348 can be configured to modify the position of the cursor on the display of the graphic in the user interface. Specifically, the cursor can be moved from the previous object position (i.e., the object position associated with the focal point of the first position datum) of the cursor to an updated object position of the cursor that is different from the previous object position. Meanwhile, the area definition module 344 can be configured to set a new dead-zone based on the updated object position of the cursor, which is different from the previous dead-zone for the previous object position of the cursor. In some embodiments, the dead-zone for the updated object position of the cursor can be set by the area definition module 344 in a similar way (e.g., use the same shape such as circle, adopt the same parameter such as the radius) as to the dead-zone for the previous object position of the cursor, at substantially the second time. In other embodiments, the dead-zone for the updated object position of the cursor can be set in any other shape, or a shape based on the recorded object.

In some embodiments, the updated object position of the cursor can be determined based on, for example, the previous object position of the cursor, the focal point of the second position datum, and/or other parameters. For example, the updated object position of the cursor can be determined as the position with the minimum distance to the previous object position of the cursor among all the positions whose corresponding dead-zone can cover the second focal point. In the example of FIG. 5, the object position 510 has a pair of x- and y-coordinates of (3, 2) (unit length), and the radius 570 for the dead-zone 530 is 5 (unit length). Thus, a second focal point (not shown in FIG. 5) at (10, 2) (unit length) is outside the dead-zone 530, and the updated object position, according to the mechanism described above, would be determined to be at (5, 2) (unit length). In other embodiments, the updated object position of the cursor can be determined in any other suitable methods. Particularly, in some embodiments, the updated object position of the cursor can be determined as the focal point of the second position datum.

Accordingly, given a cursor in a two-dimensional user interface driven by movements of an object, the movement of the cursor in the user interface can be stabilized by providing a dead-zone around an object position associated with the position of the cursor at a first time. Specifically, in some embodiments, movement of a tracked focal point (as a result of the movement of the object) inside this dead-zone does not move the cursor on the display of the user interface. If, for example, as a result of the movement of the object between the first time and a second time, the tracked focal point is moved outside the dead-zone at substantially the second time, then the cursor can move to a new object position associated with, for example, the previous object position and the tracked focal point that is associated with the position of the object at the second time. Conceptually, the dead-zone for the position of the cursor can be thought of as an invisible ring (or any other possible shape) with an object position representing the position of the cursor on the display of the user interface. Rather than mapping the tracked focal point to a new object position on the user interface whenever the tracked focal point is moved, the tracked focal point interacts with the invisible ring. As the tracked focal point reaches the boundary of the invisible ring, it drags the invisible ring around the user interface based on the received position data and the previous object position of the cursor, which in turn moves the cursor on the display of the user interface.

Returning to FIG. 3, in some embodiments, the size of the dead-zone can be manipulated by, for example, the area definition module 344 and/or the rendering module 348, to provide an improved user experience. Specifically, the size of the dead-zone can be increased or decreased according to one or more characteristics of the movement of the recorded object. In some embodiments, for example, the size of the dead-zone can change based on a velocity (i.e., speed and/or direction) of movement of the object. For example, for the two-dimensional (e.g., x- and y-directions) user interface, the size of the dead-zone can be increased (e.g., from 5 unit length to 15 unit length) when the object is detected to move towards the video capture device in a direction perpendicular to the video capture device (e.g., z-direction). Thus, any unintentional shift in the x- and/or y-directions resulting from, for example, a pushing gesture of a hand can be easily ignored when such a pushing gesture is detected. Similarly, in some embodiments, the size of the dead-zone can be decreased (e.g., from 5 unit length to 3 unit length) when the object is detected to move away from the video capture device in the z-direction. For another example, the size of the dead-zone can be decreased when the object is detected to move fast (e.g., at a speed greater than a predefined threshold), and increased when the object is detected to move slowly (e.g., at a speed lower than a predefined threshold), because a fast moving object can use less filtering than a slow moving object where jitter can be more noticeable. For yet another example, the size of the dead-zone can be increased when the object is detected to move slowly towards the video capture device in the z-direction.

In other embodiments, one or more characteristics (e.g., size, shape, boundaries, etc.) of the dead-zone can be changed based on other characteristics (e.g., acceleration rate, change of shape, trajectory of the movement, etc.) associated with movement, or any other type of motion (e.g., a change of position, a rotation, etc.), of the object. For example, the shape of the dead-zone can be switched between a square and a triangle based on the acceleration rate of the movement of the object. Furthermore, in some embodiments, a combination of two or more factors can be considered at the same time to determine a manipulation on the size or any other characteristic of the dead-zone. For example, the size of the dead-zone can be decreased when the object is detected to move with an acceleration rate greater than a predefined threshold in a certain direction (e.g., away from the video capture device).

A motion capture system implementing the processing device 300 can be used in a number of applications. As an example, for a traditional two-dimensional user interface, a virtual cursor can be drawn in a user interface that corresponds to a traditional mouse cursor. In this example, confirmation motions conducted associated with the virtual cursor can correspond to a mouse click operation in the real world. For another example, for a three-dimensional user interface, a grasping confirmation in the user interface can have a direct analogue to physically grasping a real object.

Additionally, in some embodiments, direct manipulations in the real world can be mapped to the same manipulating operations on a corresponding virtual object in the user interface. As an example, a user can directly manipulate a virtual camera using hand motions by using, for example, the techniques described with respect to the camera control module 230 in FIG. 2. In such an example, the added stabilization features described with respect to the context-sensitive stabilization module 340 can be used to produce smoother, less disconcerting camera motion.

Figure 6:
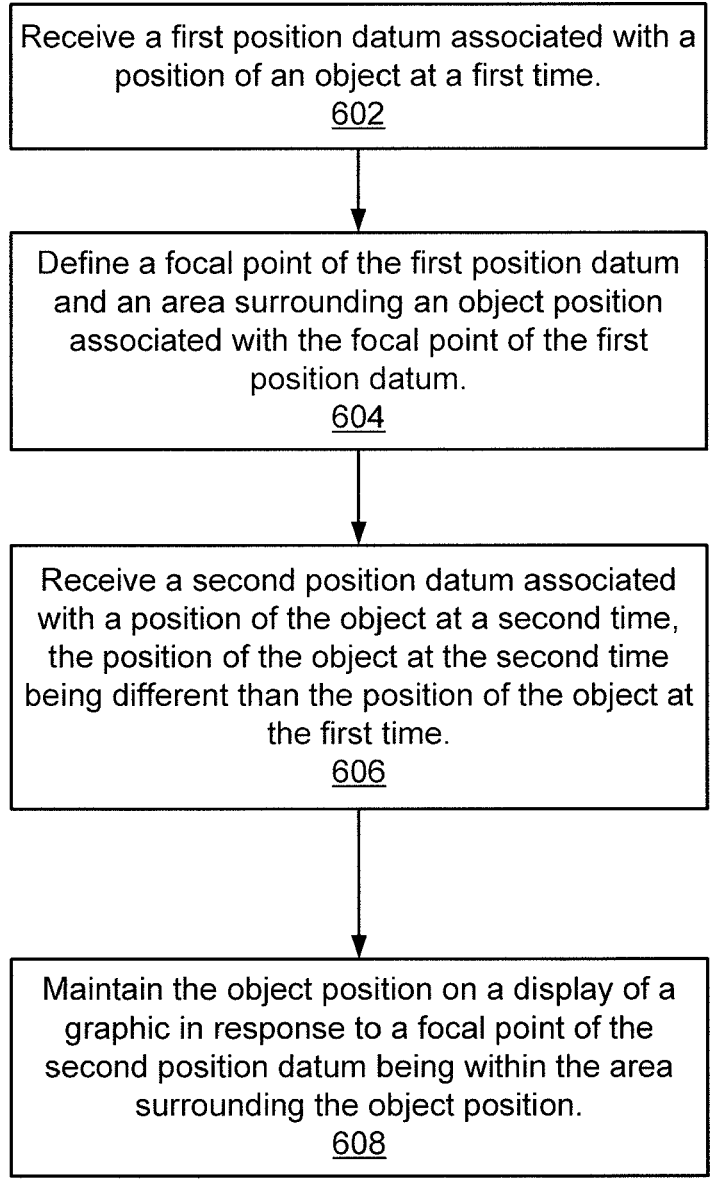
FIGS. 6 and 7 are flow charts that illustrate methods for displaying a moving object, according to embodiments.

FIG. 6 is a flow chart that illustrates a method for displaying a moving object, according to an embodiment. In some embodiments, a processing device in a motion capture system (e.g., the processing device 130 in the motion capture system 100 of FIG. 1) can have a non-transitory processor-readable medium that stores code representing instructions to be executed by a processor within that processing device. The code can include code to cause the processor within the processing device to perform, among other operations, a series of operations as described below.

At 602, a first position datum associated with a position of an object at a first time can be received. In some embodiments, for example, the first position datum can be in the form of coordinate position data (e.g., x- and y-coordinates in a two-dimensional user interface) associated with the object at the first time. The first position datum can be received at a module within the processing device from, for example, another module within that processing device or a device operatively coupled to that processing device.

In the example of FIGS. 3 and 5, for example, a first position datum associated with a position of an object at a first time can be received at the acquisition module 342 in the context-sensitive stabilization module 340 of the processing device 300 from, for example, the selection confirmation module 330. The received first position datum can include one or more sets of x-, y-, and/or z-coordinates associated with the position of the object at the first time.

At 604, a focal point of the first position datum and an area surrounding an object position associated with the focal point of the first position datum can be defined. Specifically, the focal point of the first position datum can be defined, at a module of the processing device, based on the first position datum. The focal point can be defined as, for example, a specific position included in the first position datum, or an average position (e.g., an average of x-, y-, and/or z-coordinates, a center-of-mass position) that results from multiple positions included in the first position datum.

In some embodiments, the object position and the associated area surrounding the object position can be defined based on the focal point of the first position datum. The object position can represent the position of a display of a graphic (e.g., a cursor) for the object in the user interface. In some embodiments, for example, the object position can be the focal point of the first position datum. In some embodiments, the area surrounding the object position associated with the focal point of the first position datum can be defined, for example, as a circle that is centered at the object position and has a predefined radius. In other embodiments, the area surrounding the object position can be defined as other shapes (e.g., square, triangle, etc.). In some embodiments, such an area can be referred to as a "dead-zone" for the display of the object in the user interface.

In the example of FIGS. 3 and 5, for example, a focal point of the first position datum, an object position associated with that focal point, and an area surrounding that object position can be defined at the area definition module 344 in the context-sensitive stabilization module 340 of the processing device 300. As shown in FIG. 5, the area (shown as the dead-zone 530) can be defined as a circle that is centered at the object position 510 (e.g., the focal point of the first position datum) and has a predefined radius 570.

At 606, a second position datum associated with a position of the object at a second time can be received. The position of the object at the second time is different than the position of the object at the first time. Specifically, in response to the object moving (or being moved) from the position at the first time to a different position at the second time after the first time, the second position datum associated with the new position of the object at the second time can be received and processed at the processing device similar to the first position datum. Additionally, a format of the second position datum can be similar to a format of the first position datum (e.g., including coordinate position data).

In the example of FIGS. 3 and 5, for example, in response to the object moving (or being moved) from the position (represented by the object position 510 in FIG. 5) at the first time to a different position (represented by the tracked focal point 550 in FIG. 5) at the second time after the first time, a second position datum associated with the new position of the object at the second time can be received at the acquisition module 342 within the processing device 300, similar to the first position datum.

At 608, the object position on the display of the graphic can be maintained in response to a focal point of the second position datum being within the area surrounding the object position. After the second position datum is received, the focal point of the second position datum can be determined at the processing device similar to the first position datum. Subsequently, the focal point of the second position datum can be compared, by a module (e.g., the comparison module 346 of FIG. 3) of the processing device, with the defined area (e.g., the dead-zone) surrounding the object position associated with the focal point of the first position datum. If the focal point of the second position datum is within the area surrounding the object position, the object position of the display of the graphic for the object can be maintained in the user interface. Said in another way, the position of the display of the graphic for the object is not moved from the object position to the focal point of the second position datum, or any other position on the display of the user interface. In some embodiments, the graphic of the object can be a cursor. In some embodiments, the graphic of the object can be a representation of at least a portion of the object. In other embodiments, the graphic of the object can be any other type of a virtual object (e.g., a shortcut, a desktop icon, a UI element, etc.).

In the example of FIGS. 3 and 5, for example, after the second position datum is received, the focal point of the second position datum (represented by the focal point 550 in FIG. 5) can be determined at the area definition module 344 of the processing device 300 similar to the focal point of the first position datum. Subsequently, the focal point of the second position datum can be compared, by the comparison module 346 of the processing device 300, with the defined area (represented by the dead-zone 530 in FIG. 5) surrounding the object position 510. Because the focal point 550 is inside the dead-zone 530, the position of the display of the graphic of the object is maintained at the object position 510. Similarly stated, the graphic of the object is not moved from the object position 510 to the focal point 550 or any other position on the display of the user interface.

In some embodiments, a third position datum associated with a position of the object at a third time can be received, where the third time can be later than the first time and the second time. Similar to the second position datum, the third position datum can be received, for example, at a module of the processing device (e.g., the acquisition module 342 of the processing device 300 in FIG. 3), in response to the object moving (or being moved) from the position at the first time to a different position at the third time (also different from the position at the second time). Subsequently, a focal point of the third position datum can be determined at a module of the processing device (e.g., the area definition module 344 at the processing device 300 in FIG. 3) similar to the first position datum and the second position datum.

The focal point of the third position datum can be compared, by a module of the processing device (e.g., the comparison module 346 of the processing device 300 in FIG. 3), with the defined area surrounding the object position associated with the focal point of the first position datum. If the focal point of the third position datum is outside the area surrounding the object position (e.g., the dead-zone), a signal can be sent to move the graphic from the previous object position (i.e., the object position associated with the focal point of the first position datum) on the display to an updated object position on the display. The previous object position on the display can be associated with the focal point of the first position datum, and the updated object position on the display can be associated with, for example, the previous object position and the focal point of the third position datum.

Furthermore, based on the focal point of the third position datum being outside the area surrounding the object position associated with the focal point of the first position datum, an area surrounding the updated object position can be defined similar to the area defined surrounding the previous object position. Particularly, the size of the area surrounding the updated object position can be different from the size of the area surrounding the previous object position based on one or more characteristics associated with the movement of the object between the position of the object at the first time and the position of the object at the third time. Such characteristics can include, for example, a direction of the movement, a speed of the movement, acceleration, and/or the like.

Figure 7:
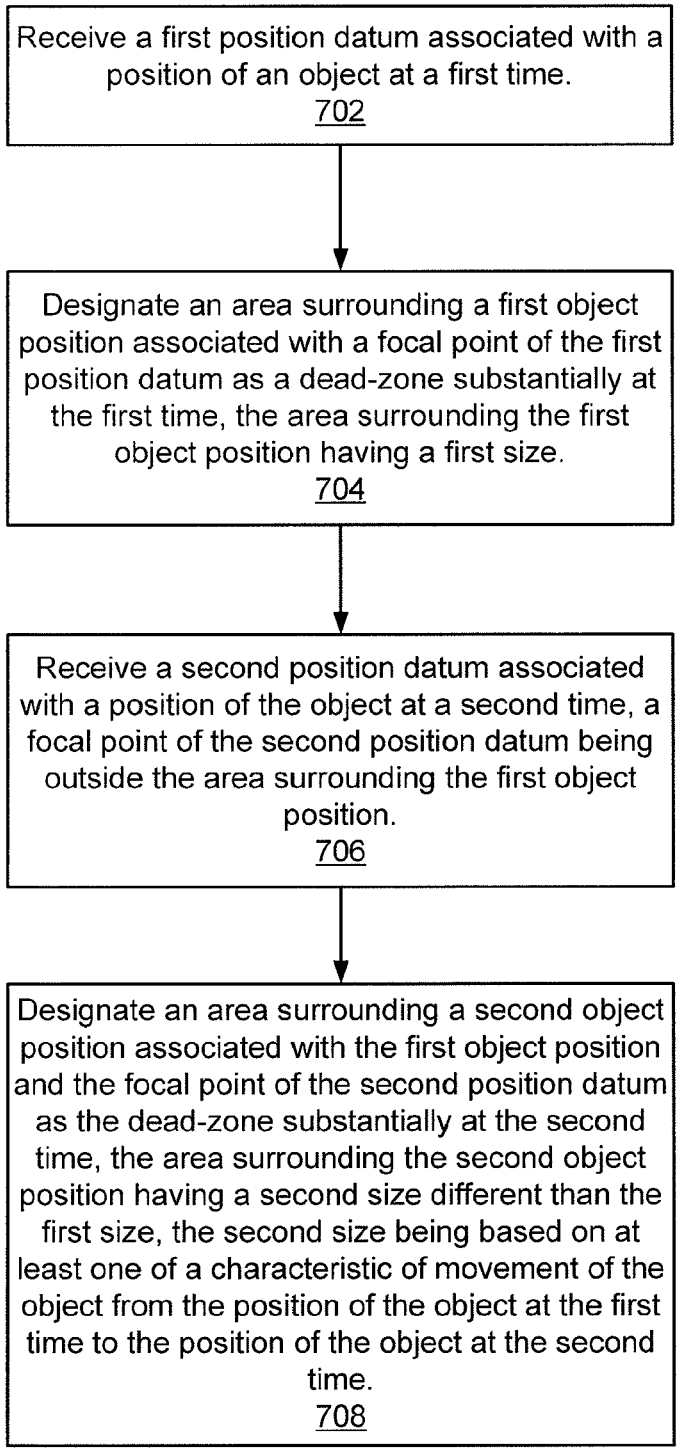

FIG. 7 is a flow chart that illustrates a method for displaying a moving object based on the movement of the object, according to an embodiment. In some embodiments, a processing device in a motion capture system (e.g., the processing device 130 in the motion capture system 100 in FIG. 1) can have a non-transitory processor-readable medium that stores code representing instructions to be executed by a processor within that processing device. The code can include code to cause the processor within the processing device to perform, among other operations, a series of operations as described below.

At 702, a first position datum associated with a position of an object at a first time can be received. As described herein, the first position datum can be in the form of, for example, coordinate position data (e.g., x-, y-, and/or z-coordinates in a two-dimensional user interface or a three-dimensional user interface) associated with the object at the first time. The first position datum can be received at a module within the processing device from, for example, another module within that processing device or a device operatively coupled to that processing device.

In the example of FIGS. 3 and 5, for example, a first position datum associated with a position of an object at a first time can be received at the acquisition module 342 in the context-sensitive stabilization module 340 of the processing device 300, from the stabilization module 310, the coordinate system translation module 320, or the selection confirmation module 330. The received first position datum can include, for example, one or more sets of x-, y-, and/or z-coordinates associated with the position of the object at the first time.

At 704, an area surrounding a first object position associated with a focal point of the first position datum can be designated as a dead-zone substantially at the first time. The area surrounding the first object position has a first size. As described herein, the focal point can be defined at a module of the processing device (e.g., the area definition module 344 of FIG. 3) based on the first position datum, the first object position and the dead-zone can be defined at the same module of the processing device based on the focal point of the first position datum. For example, the focal point can be defined as a specific position included in the first position datum, the first object position can be defined as that focal point, and the corresponding dead-zone can be designated as a circle that is centered at the object position and has a predefined radius.

In the example of FIGS. 3 and 5, for example, a focal point of the first position datum, a first object position and a dead-zone associated with that focal point can be defined at the area definition module 344 in the context-sensitive stabilization module 340 of the processing device 300. As shown in FIG. 5, the dead-zone 530 can be designated as a circle that is centered at the object position 510 (which can be the focal point of the first position datum) and has a predefined radius 570.

At 706, a second position datum associated with a position of the object at a second time can be received, where a focal point of the second position datum is outside the area surrounding the first object position. As described herein, in response to the object moving (or being moved) from the position at the first time to a different position at the second time, the second position datum associated with the position of the object at the second time can be received at the processing device, similar to the first position datum. Subsequently, the focal point of the second position datum can be determined at a module of the processing device, similar to the first position datum. The resulted focal point of the second position datum can then be compared with the area (i.e., dead-zone) surrounding the first object position to determine whether that focal point is inside or outside that area. In some embodiments, the focal point of the second position datum can be determined as outside the dead-zone for the first object position.

In the example of FIGS. 3 and 5, for example, in response to the object moving (or being moved) from the position (represented by the object position 510 in FIG. 5) at the first time to a different position at the second time, a second position datum associated with the position of the object at the second time can be received at the acquisition module 342 within the processing device 300, similar to the first position datum. Subsequently, a focal point of the second position datum (not shown in FIG. 5) can be determined at the area definition module 344 of the processing device 300 similar to the first position datum. The focal point of the second position datum can then be compared, at the comparison module 346 of the processing device 300, with the dead-zone 530 to determine whether the focal point of the second position datum is inside or outside the dead-zone 530.

At 708, an area surrounding a second object position associated with the first object position and the focal point of the second position datum can be designated as the dead-zone substantially at the second time. In some embodiments, based on the focal point of the second position datum being outside the dead-zone for the first object position, the area surrounding the second object position has a second size different than the first size. The second size can be based on at least one of a characteristic of movement of the object from the position of the object at the first time to the position of the object at the second time. As described herein, as a result of the focal point of the second position datum being outside the dead-zone for the first object position, the second object position can be determined based on, for example, the first object position, the focal point of the second position datum, and/or other parameters. Furthermore, a new dead-zone can be designated based on the second object position and/or other parameters (e.g., the second position datum). Similar to the dead-zone designated for the first object position, the dead-zone for the second object position can be designated as, for example, a circle centered at the second object position with a predefined radius.

Furthermore, in some embodiments, the size of the dead-zone designated for the second object position (e.g., the radius of a designated circle) can be different than that of the dead-zone for the first object position, based on one or more characteristics of movement of the object from the position of the object at the first time to the position of the object at the second time. In some embodiments, the characteristics of movement of the object can include a velocity (i.e., speed and/or direction) of movement of the object. The velocity datum associated with the velocity of movement of the object can be calculated based on, for example, the first position datum, the second position datum and a duration of time between the first time and the second time. Alternatively, the velocity datum associated with the velocity of movement of the object can be calculated using any other suitable method, or received from, for example, a sensor. In some other embodiments, the characteristics of movement of the object can include, for example, an acceleration rate of movement of the object from the position of the object at the first time to the position of the object at the second time. The acceleration rate can be calculated using, for example, the position datum (e.g., the first position datum, the second position datum), the velocity datum (e.g., the velocity datum associated with the velocity of movement of the object between the first time and the second time), a time duration (e.g., the duration of time between the first time and the second time), and/or other parameters.

In some embodiments, based on the focal point of the second position datum being outside the dead-zone for the first object position, a signal can be sent to move a graphic (e.g., a cursor) on a display of the user interface from the first object position on the display to the second object position on the display. As described herein, the first object position on the display can be associated with the focal point of the first position datum, and the second object position on the display can be associated with focal point of the second position datum. In some embodiments, the graphic of the object can be a cursor, a representation of a portion of the object, or the like.

While various embodiments have been described above, it should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described. Furthermore, where methods described herein indicate certain events occurring in certain order, the ordering of certain events may be modified. Additionally, certain of the events may be performed concurrently in a parallel process when possible, as well as performed sequentially as described herein.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), and Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

What is claimed is:

1. An apparatus, comprising:
   an acquisition module configured to receive a first position datum associated with a position of an object at a first time, the acquisition module configured to receive a second position datum associated with a position of the object at a second time after the first time;
   an area definition module configured to define a focal point of the first position datum, the area definition module configured to set an area surrounding a first object position associated with the focal point of the first position datum as a dead-zone at substantially the first time;
   a comparison module configured to determine whether a focal point of the second position datum is within the area surrounding the first object position substantially at the second time, the area definition module configured to set an area surrounding a second object position as the dead-zone at substantially the second time if the focal point of the second position datum is outside the area surrounding the first object position, the second object position being associated with the first object position and the focal point of the second position datum; and
   a rendering module configured to maintain a position on a display of a graphic if the focal point of the second position datum is within the area surrounding the first object position.

2. The apparatus of claim 1, wherein the rendering module is configured to modify the position on the display of the graphic if the focal point of the second position datum is outside the area surrounding the first object position.

3. The apparatus of claim 1, wherein the area definition module is configured to maintain the area surrounding the first object position as the dead-zone at substantially the second time if the focal point of the second position datum is within the area surrounding the first object position.

4. The apparatus of claim 1, wherein the area surrounding the second object position has a size greater than a size of the area surrounding the first object position based on a velocity of movement of the object between the position of the object at the first time and the position of the object at the second time.

5. The apparatus of claim 1, wherein the area surrounding the second object position has a size less than a size of the area surrounding the first object position based on a velocity of movement of the object between the position of the object at the first time and the position of the object at the second time.

6. The apparatus of claim 1, wherein the graphic is a cursor.

7. The apparatus of claim 1, wherein the graphic is a representation of at least a portion of the object.

8. A non-transitory processor-readable medium storing code representing instructions to be executed by a processor, the code comprising code to cause the processor to:
   receive a first position datum associated with a position of an object at a first time;
   define a focal point of the first position datum and an area surrounding an object position associated with the focal point of the first position datum;
   receive a second position datum associated with a position of the object at a second time, the position of the object at the second time being different than the position of the object at the first time; and
   maintain the object position on a display of a graphic in response to a focal point of the second position datum being within the area surrounding the object position.

9. The non-transitory processor-readable medium of claim 8, wherein the object position on the display is a first object position on the display, the code further comprising code to cause the processor to:
   receive a third position datum associated with a position of the object at a third time; and
   send, based on a focal point of the third position datum being outside the area surrounding the first object position, a signal to move the graphic from the first object position on the display to a second object position on the display, the first object position on the display being associated with the focal point of the first position datum, the second object position on the display being associated with the first object position and the focal point of the third position datum.

10. The non-transitory processor-readable medium of claim 8, wherein the object position is a first object position, the code further comprising code to cause the processor to:
   receive a third position datum associated with a position of the object at a third time; and
   define, based on a focal point of the third position datum being outside the area surrounding the first object position, an area surrounding a second object position associated with the first object position and the focal point of the third position datum,
   the area surrounding the second object position having a size greater than a size of the area surrounding the first object position based on a velocity of movement of the object between the position of the object at the first time and the position of the object at the third time.

11. The non-transitory processor-readable medium of claim 8, wherein the object position is a first object position, the code further comprising code to cause the processor to:
   receive a third position datum associated with a position of the object at a third time;

define, based on a focal point of the third position datum being outside the area surrounding the first object position, an area surrounding a second object position associated with the first object position and the focal point of the third position datum, the area surrounding the second object position having a size less than a size of the area surrounding the first object position based on a velocity of movement of the object between the position of the object at the first time and the position of the object at the third time.

12. The non-transitory processor-readable medium of claim 8, wherein the graphic is a cursor.

13. The non-transitory processor-readable medium of claim 8, wherein the graphic is a representation of at least a portion of the object.

14. The non-transitory processor-readable medium of claim 8, wherein the object is at least one of a projectile, an instrument, a tool, an animal, a human or a human body part.

15. The non-transitory processor-readable medium of claim 8, further comprising code to cause the processor to:

receive a third position datum associated with a position of the object at a third time; and modify a size of the area surrounding the object position associated with the focal point of the first position datum in response to one of a velocity of movement or acceleration of the object between the position of the object at the first time and the position of the object at the third time.

16. A non-transitory processor-readable medium storing code representing instructions to be executed by a processor, the code comprising code to cause the processor to:

receive a first position datum associated with a position of an object at a first time;

designate an area surrounding a first object position associated with a focal point of the first position datum as a dead-zone at substantially the first time, the area surrounding the first object position having a first size;

receive a second position datum associated with a position of the object at a second time, a focal point of the second position datum being outside the area surrounding the first object position; and designate an area surrounding a second object position associated with the first object position and the focal point of the second position datum as the dead-zone substantially at the second time, the area surrounding the second object position having a second size different than the first size, the second size being based on at least one of a characteristic of movement of the object from the position of the object at the first time to the position of the object at the second time.

17. The non-transitory processor-readable medium of claim 16, wherein the characteristic of movement of the object is a velocity of movement of the object from the position of the object at the first time to the position of the object at the second time, the code further comprising code to cause the processor to:

calculate the velocity datum associated with the velocity of movement of the object based on the first position datum, the second position datum and a duration of time between the first time and the second time.

18. The non-transitory processor-readable medium of claim 16, wherein the characteristic of movement of the object is an acceleration of movement of the object from the position of the object at the first time to the position of the object at the second time.

19. The non-transitory processor-readable medium of claim 16, further comprising code to cause the processor to:

send, based on the focal point of the second position datum being outside the area surrounding the first object position, a signal to move a graphic on a display from the first object position on the display to the second object position on the display, the first object position on the display being associated with the focal point of the first position datum, the second object position on the display being associated with the first object position and the focal point of the second position datum.

20. The non-transitory processor-readable medium of claim 19, wherein the graphic is one of a cursor or a representation of a portion of the object.

* * * * *